United States Patent [19]

Marshall et al.

[11] Patent Number: 4,675,769
[45] Date of Patent: Jun. 23, 1987

[54] ELECTRONIC BOARD IDENTIFICATION

[75] Inventors: Peter G. Marshall, Grafton; Ulrich B. Goerke, Westboro, both of Mass.

[73] Assignee: Data General Corporation, Westboro, Mass.

[21] Appl. No.: 798,735

[22] Filed: Nov. 15, 1985

[51] Int. Cl.[4] ............................................. H02H 3/00
[52] U.S. Cl. ...................................... 361/1; 361/415; 307/140; 379/326
[58] Field of Search ....................... 361/1, 58, 88, 412, 361/415; 307/140, 200 A; 179/18 ES, 98, 81 R; 279/326, 325, 327

[56] References Cited

U.S. PATENT DOCUMENTS

| | | | |
|---|---|---|---|
| 3,191,095 | 6/1965 | Hefti | 361/88 |
| 3,519,757 | 7/1970 | Anderson et al. | 179/18 ES |
| 3,588,365 | 6/1971 | McNeilly et al. | 179/81 R |
| 4,079,440 | 3/1978 | Ohnuma et al. | 361/58 X |
| 4,245,270 | 1/1981 | Busby | 361/58 |
| 4,454,552 | 6/1984 | Barnes et al. | 361/58 X |
| 4,507,697 | 3/1985 | Ozil et al. | 361/1 |

Primary Examiner—A. D. Pellinen
Assistant Examiner—Derek S. Jennings
Attorney, Agent, or Firm—Robert M. Asher

[57] ABSTRACT

The invention electronically identifies whether a computer module board is placed in the correct mechanical slot in a computer frame. A conductive line is connected to at least one electronic connector location in each mechanical slot in a computer frame. A computer module has open circuit electrical connectors which if put in the correct slot will mate with the locations in the slot in the frame which are connected to the conductive line. The other electrical connections which are used for identification are connected to a ground plane in the computer module board. A voltage source is connected through a resistor to a conductive line in the computer frame producing a high signal. If any computer module board engaged in a slot of the computer frame is in the incorrect slot, a low signal will be caused indicating the fault. The fault signal will be supplied to a power supply controller which prevents operating power from being provided to the computer boards.

6 Claims, 2 Drawing Figures

ELECTRONIC BOARD IDENTIFICATION

BACKGROUND OF THE INVENTION

This invention relates to electronic board identification method and apparatus for use in large computer systems with a plurality of module boards.

Main frame computer systems generally include a plurality of computer module boards, including processing modules, memory modules, input/output controllers, and power system boards. It has been a general practice to provide the module boards with a mechanical protrusion specially located on each board so that a board could not be incorrectly inserted into the computer frame. A computer frame has a number of slots for receiving computer module boards each uniquely provided with mating holes for the protrusions of the correctly inserted module board to engage. However, it has been found that this mechanical keying method suffers from the disadvantage of being easily defeated. It is not uncommon for an identifying protrusion to become worn and fall off a module board or computer frame. When a protrusion is lost so is the protection of the keying method. Similarly, technicians encountering a computer module board which is difficult to fit into a slot in the main frame may tend to attempt jamming the module board into the slot. This may further damage the mechanical keying mechanisms and may overcome the protection normally provided. If the mechanical keying is defeated, a module board may end up in an incorrect slot leading to possible damage of the board or the computing system.

SUMMARY OF THE INVENTION

The present invention is directed to a method of identifying the correct slot for a computer module board through electronic identification. Each connection slot of a computer frame is provided with a plurality of identifying electrical connectors connected to an identifying conductive line. The conductive line is connected through a resistor to a voltage source. The identifying electrical connectors in a connection slot are placed so as to uniquely match a plurality of identifying open circuit electrical connectors on the correct computer board. A computer module board includes a plurality of electrical connectors which are connected to a ground plane on the computer module board. If the computer module board is inserted into the correct slot in the computer frame the identifying conductive line will be connected to the identifying open circuit connectors in the module board and the voltage source will supply a voltage throughout the conductive line. If a computer board is incorrectly placed into a mechanical connection slot in the computer frame, the conductive line will be grounded by the ground plane of the computer module board. The computer frame is provided with means responsive to the grounding of the conductive line for preventing the supply of operating power to the computer module boards.

A second conductive line may be used in conjunction with a set of identifying electrical connector locations which are the same for a plurality of boards belonging to a family of boards. If one of the boards of the family is incorrectly placed in a mechanical slot for another board of the same family, it may not be necessary to prevent operating power to the computer boards. However, means are provided for alerting the user to the incorrect placement of a board.

Other objects and advantages of the invention will become apparent during the following description of the presently preferred embodiment of the invention taken in conjunction with the drawings.

DETAILED DESCRIPTION OF THE PREFERRED EMBODIMENT

Figure 1:
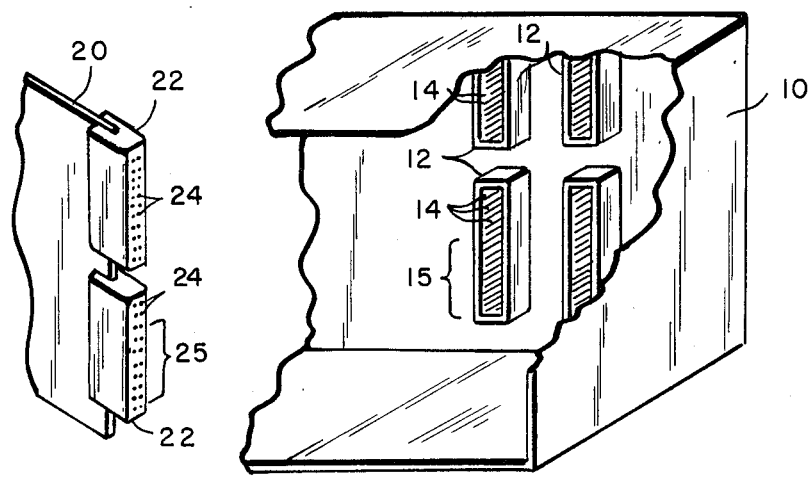
FIG. 1 is a drawing partially broken away of a computer frame and computer module board using the present invention.

Referring now to FIG. 1, a computer frame 10 and a computer module board 20 are illustrated. The computer frame 10 includes a plurality of mechanical connection slots 12. Each connection slot 12 includes a plurality of electrical connectors 14. The drawings have been simplified to reduce the number of electrical connectors illustrated. The invention is not restricted to any particular number of electrical connectors. The plurality of the electrical connectors 14 include a plurality of identifying electrical connectors 15 assigned the task of electronic board identification. The mechanical connection slot 12 may be a slot for receiving a plated edge of a circuit board or a conventional edge connector or any other equivalent means of connection for a plurality of electrical connectors known in the art.

Computer frame 10 holds a number of different computer module boards including a processing unit, a memory module, a memory control unit, an input/output channel controller or any number of other module boards. The use of module boards 20 in conjunction with a computer frame enables users to expand present system. Thus, it is desirable to insure that a user, when inserting a board into a computer frame 10 to expand the system, places that board in the correct slot 12. It must at least be ascertained that the board is designed to receive power in the locations which will matingly engage with the power providing locations in the computer frame 10. Although different module boards from a single computer system may be designed so that they may be interchanged without damaging a computer board if wrongly inserted, this may not be case if a board is selected from a different computer system whether it be by the same manufacturer or a different one. The present invention includes features which prevent damage from occurring when a board is incorrectly inserted in a computer frame.

A computer module board 20 includes a mechanical connector 22 which matingly engages with a mechanical connection slot 12 in a computer frame 10. The mechanical connector 22 includes a plurality of electrical connectors 24 which matingly engage with the electrical connectors 14 on the computer frame 10. The electrical connectors 24 on the boards 20 are female connectors in the presently preferred embodiment and the electrical connectors 14 in a slot 12 are male connectors. However, it is fully within the scope of the present invention to make electrical connectors 24 male and connectors 14 in a slot female. The plurality of electrical connectors 24 include a plurality of identifying connectors 25 assigned the task of electronic board identification.

Figure 2:
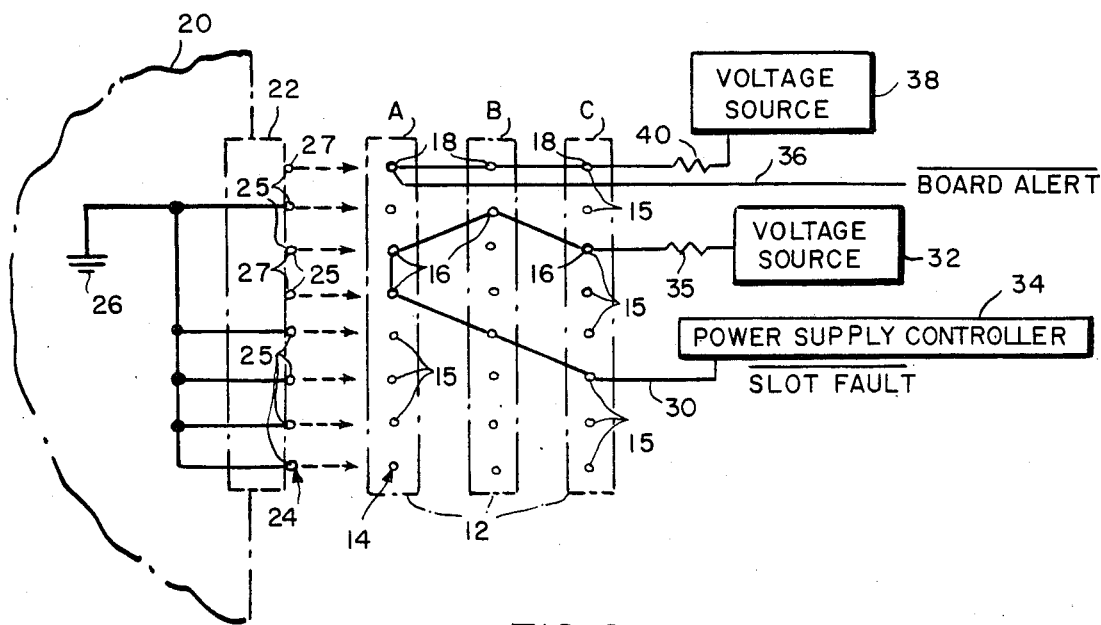
FIG. 2 is an electrical schematic of the present invention.

The electrical operation of the present invention is described with reference to FIG. 2. For illustration purposes, FIG. 2 shows eight connectors assigned to board identification in each of three mechanical slots 12 in a computer frame 10. Any number of available connectors 14 may be used as identifying connectors 15 in a computer system. A conductive line 30 is connected through one or more of the identifying electrical connectors 15 in each mechanical slot 12. The connectors which are connected to the conductive line 30 are referred to herein as coded open connectors 16. A schematic representation of a module board 20 is shown in FIG. 2. The module board 20 shown in FIG. 2 is a correct mate for slot A of FIG. 2. A module board which is correctly placed has open circuit identifying electrical connectors 27 in the locations which will mate with the coded open connectors 16 in the mechanical connection slots 12. The remaining identifying electrical connectors 25 in the mechanical connector 22 of the computer module board 20 are connected to ground plane 26 on the compute module board. The ground plane will connect to ground through one or more of the electrical connectors 24 when the electrical connectors mate with corresponding ground locations in the computer frame. The ground plane may be imbedded in a multilayer circuit board or may be provided on the board in some other manner known to those of ordinary skill in the art.

A voltage source 32 is connected through a resistor 35 to the conductive line 30. The voltage source may be a typical voltage signal of five volts. If any module boards are connected to their proper mechanical connection slot 12 then conductive line 30 will remain an open circuit and produce a high signal. All of the coded open connectors 16 which engage a connector 24 in a board will be engaging an identifying open circuit connector 27 on the board. The high signal identified as no SLOT FAULT will be provided to a power supply controller 34. The signal indicates that there is no slot fault and will allow the supply of power to the module boards. However, if a computer module board is incorrectly placed in a mechanical slot 12 one of the grounded identifying connectors 25 will mate with one of the coded open locations 16 in the mechanical slot 12 thus causing the signal into the power supply controller 34 to go low. The grounding of the conductive line 30 is treated as a condition in the power supply controller 34 which prevents the controller from providing power to the computer modules. Logic gates circuitry may be provided by one of ordinary skill in the art in the power supply controller 34 to handle a slot fault by preventing the supply of operating power to the computer modules.

It is also possible but not necessary to provide a second conductive line 36 which is used to identify whether a computer board belongs to a particular family of computer boards. Conductive line 36 is connected to a family coded location 18 in each mechanical slot 12 which is identically located. Although a board from the same family with the same computer system may not function in the wrong slot, the boards of a family can be designed to avoid danger of destroying computer boards by providing each board of a family with power connections in the same locations. Therefore, it would still be possible to turn the operating power on with a board of the correct family in an incorrect slot 12. A voltage source 38 is connected in series with a resistance 40 to the second conductive line 36. Instead of preventing operating power, line 36 may be used to provide a signal to the user indicating that a board is incorrectly inserted. This is shown as a BOARD ALERT signal in FIG. 2. The family identifying connectors are located in identical locations for each computer module board in a family.

The present invention dispenses with the prior practice of mechanical keying. In accordance with the present invention, the computer module boards are provided with a set of electrical connectors which are either grounded or open circuits. The placement of the grounded connectors and open circuit connectors identify a board. Repeated removal and replacement of a computer module board using the present invention should not affect the integrity of the electronic board identification.

Of course, it should be understood that various changes and modifications to the preferred embodiments described will be apparent to those skilled in the art. For example, a ground plane may be replaced by a conductive line which connects all the grounded electrical connectors. This and other changes can be made without departing from the spirit and the scope of the invention and without diminishing its attendant advantages. It is therefore intended that such changes and modifications be covered by the following claims.

We claim:

1. A method of preventing operating power from being supplied to a computer module board which is connected to a wrong connection slot in a computer frame, said method comprising:
providing each of a plurality of computer module boards with a mechanical connector having at least one open circuit electrical connector in an identifying location and a plurality of electrical connectors connected to ground;
engaging the mechanical connector of one of said computer module boards with a mechanical connection slot in a computer frame;
applying a voltage through a resistance to a conductive line connected to each of a plurality of identifying electrical connectors in the mechanical connection slots of said computer frame;
receiving an output voltage from said conductive line; and
preventing the supply of operating power to the mechanical connection slots in the computer frame if said output voltage is grounded.

2. Electronic computer board identifying apparatus comprising;
a computer frame having a plurality of connection slots for engaging computer module boards, each of said connection slots including a plurality of electrical connectors;
a conductive identifier line connected to at least one electrical connector in each of said connection slots;
a voltage source connected through a resistor to said identifier line; and
means for detecting whether said conductive line is grounded.

3. The apparatus of claim 2 further comprising a second conductive identifier line connected to one or more electrical connectors identically located in a plurality of said connection slots, said conductive identifier line identifying a family of computer module boards.

4. The apparatus of claim 3 further comprising a voltage source connected through a resistor to said second conductive identifier line and means for generating an alerting signal if said second conductive line becomes grounded.

5. The apparatus of claim 2 further comprising a plurality of computer module boards, each having a mating mechanical connector with a plurality of mating electrical connectors, said mating electrical connectors including a plurality of identifying connectors connected to ground on said module board and at least one open circuit identifying connector located so as to mate with said at least one electrical connector connected to said conductive identifier line in a correct one of said mechanical connection slots.

6. A family of computer module boards comprising:
a plurality of computer module boards each having a mechanical connector with a plurality of electrical connectors, said plurality of electrical connectors including;
at least one open circuit identifying connector located identically in the mechanical connector of each of said computer module boards so as to electrically identify each board as a member of said family;
at least one open circuit identifying connector located so as to electrically distinguish each board in said family; and
a plurality of identifying connectors connected to ground on the computer module board.

* * * * *